United States Patent
Xie et al.

(10) Patent No.: US 11,453,826 B2
(45) Date of Patent: Sep. 27, 2022

(54) LIQUID CRYSTAL ALIGNMENT AGENT, LIQUID CRYSTAL ALIGNMENT FILM AND LIQUID CRYSTAL DISPLAY ELEMENT

(71) Applicant: JIANGSU SUNERA TECHNOLOGY CO., LTD., Wuxi (CN)

(72) Inventors: Wanlong Xie, Wuxi (CN); Xiaorui Wang, Wuxi (CN); Shidong Li, Wuxi (CN); Mingjiao Wang, Wuxi (CN); Huicai Ren, Wuxi (CN); Hu Sun, Wuxi (CN)

(73) Assignee: JIANGSU SUNERA TECHNOLOGY CO., LTD., Wuxi (CN)

( * ) Notice: Subject to any disclaimer, the term of this patent is extended or adjusted under 35 U.S.C. 154(b) by 0 days.

(21) Appl. No.: 17/697,966

(22) Filed: Mar. 18, 2022

(65) Prior Publication Data
US 2022/0204854 A1    Jun. 30, 2022

Related U.S. Application Data

(63) Continuation of application No. PCT/CN2020/078129, filed on Mar. 6, 2020.

(30) Foreign Application Priority Data

Sep. 27, 2019 (CN) .......................... 201910921333.0

(51) Int. Cl.
*C08G 73/10* (2006.01)
*C09K 19/56* (2006.01)

(52) U.S. Cl.
CPC .......... *C09K 19/56* (2013.01); *C08G 73/1039* (2013.01); *C08G 73/1064* (2013.01); *C08G 73/1067* (2013.01); *C09K 2219/03* (2013.01); *C09K 2323/0271* (2020.08)

(58) Field of Classification Search
CPC ............ C08G 73/1067; C08G 73/1039; C09D 179/08; C08J 5/18
See application file for complete search history.

(56) References Cited

U.S. PATENT DOCUMENTS

| 8,962,739 | B2 | 2/2015 | Liang |
| 9,188,812 | B2 | 11/2015 | Tsai |
| 9,963,471 | B2 | 5/2018 | Lan |

FOREIGN PATENT DOCUMENTS

| CN | 101925849 A | 12/2010 |
| CN | 102947754 B | 6/2016 |
| CN | 104220488 B | 5/2017 |
| CN | 110734771 A | 1/2020 |
| EP | 1111442 A1 | 6/2001 |

OTHER PUBLICATIONS

USPTO structure search, Jun. 2022.*
Internation Search Report of PCT/CN2020/078129, dated Jun. 23, 2020.

* cited by examiner

*Primary Examiner* — Gregory Listvoyb
(74) *Attorney, Agent, or Firm* — True Shepherd LLC; Andrew C. Cheng

(57) ABSTRACT

Provided are a liquid crystal alignment agent, a liquid crystal alignment film and a liquid crystal display element. The liquid crystal alignment agent at least comprises one of a polyamic acid solution and a polyimide solution. The polyamic acid solution is obtained by means of a polymerization reaction of diamine compound component A and dianhydride compound component B in a solvent, and the polyimide solution is obtained from the polyamic acid solution via a dehydration imidization treatment. The diamine component A at least comprises one of the diamine compounds represented by "formula 1". The obtained liquid crystal alignment agent has a better liquid crystal alignment capability, an excellent effect on image sticking, and the effect that decomposition products resulting from light alignment are easy to remove.

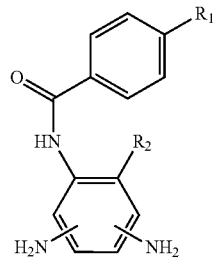

Formula 1

8 Claims, No Drawings

LIQUID CRYSTAL ALIGNMENT AGENT, LIQUID CRYSTAL ALIGNMENT FILM AND LIQUID CRYSTAL DISPLAY ELEMENT

CROSS-REFERENCE TO RELATED APPLICATIONS

This application is a continuation of International Patent Application No. PCT/CN2020/078129 with a filing date of Mar. 6, 2020, designating the United States, now pending, and further claims priority to Chinese Patent Application No. 201910921333.0 with a filing date of Sep. 27, 2019. The content of the aforementioned applications, including any intervening amendments thereto, are incorporated herein by reference.

TECHNICAL FIELD

The present disclosure pertains to the technical field of liquid crystal display, and in particular to a liquid crystal alignment agent, a liquid crystal alignment film and a liquid crystal display element.

BACKGROUND

Liquid crystal displays have now become a mainstream technology of the information display industry, and have been widely used in various display areas such as calculator, mobile phone, digital camera, computer display, vehicle display and so on because of display advantages such as high resolution, high brightness, light weight, low energy consumption and complanation. The working principle of the liquid crystal display is to apply an external electric field to the liquid crystal, and polar molecules of the liquid crystal are twisted under an action of the external electric field, which changes the internal arrangement state of the liquid crystal molecules and changes the direction of the incident polarized light. Then the use of polarizers can control whether the light passes or not, so as to achieve purpose of display. Liquid crystal display elements usually use an alignment film to control the initial alignment state of the liquid crystal. The liquid crystal alignment film is prepared by coating a liquid crystal alignment agent on a display substrate, and then baking and aligning. The most mainstream of the alignment treatment method is rubbing alignment treatment. That is, cotton cloth or nylon is used to rub the liquid crystal alignment film on the electrode substrate in a single direction, so that the surface of the liquid crystal alignment film is grooved or the molecules on the surface of the alignment film are arranged orderly along the rubbing direction, thereby inducing the alignment of the liquid crystal molecules on the surface of the alignment film. With the development and progress of society, people have higher and higher requirements for the quality of liquid crystal displays, and various problems such as surface scratches, debris, static electricity and uneven processing in the rubbing alignment can no longer meet the existing needs.

As an alternative to the rubbing alignment, it is known that polarized ultraviolet light is used to irradiate the surface of the liquid crystal alignment film to align the liquid crystal. Photoalignment treatment can be divided into three types according to the mechanism: photodecomposition, photoisomerization and photocrosslinking. Due to its poor stability in the later stage of photoisomerization, photodecomposition and photocrosslinking are currently more popular.

The liquid crystal cell is divided into a TN (Twisted Nematic) type, a STN (Super Twisted Nematic) type, an IPS (In-Plane Switching), FFS (Fringe Field Switching) VA (Vertical Alignment) type and other liquid crystal display elements according to the change state and driving mode of the liquid crystal before and after the application of the applied electric field, where the IPS and FFS display modes are widely used in high-end display areas such as mobile phones, televisions and computer displays because of their advantages of high contrast and wide field of view. Compared with the existing rubbing alignment process, the above photoalignment treatment method helps to improve the contrast ratio and viewing angle of the IPS and FFS display mode, because the photoalignment treatment is more uniform than the rubbing alignment and is not affected by the uneven shape, scratches and static electricity of the substrate surface. However, compared with the rubbing alignment, the photo-alignment treatment has the problem of weak anchoring capacity of the liquid crystal, and residual image caused by small anisotropy will be produced after a long time of AC driving.

DC bias charges will be generated during the driving of IPS and FFS liquid crystal display elements THF (Thin Film Transistor). As the DC bias charges accumulate on the surface, the accumulated charges cannot be quickly dissipated when switching the image, which will cause the electric field intensity received by the liquid crystal to be inconsistent with the applied electric field intensity, resulting in residual image caused by the accumulation of DC charges.

When the IPS and FFS liquid crystal display elements are subjected to an alignment treatment of the mechanism of photodecomposition, a polymer on the surface of the liquid crystal alignment film will decompose along the polarization direction of the ultraviolet polarized light, resulting in small molecular decomposition products. For the decomposition products in industrial production, the liquid crystal alignment film is usually contacted with water or an organic solvent after the alignment treatment to dissolve and remove the photo-decomposition products. Insufficient removal of decomposition products will lead to poor alignment in some areas, resulting in abnormal display phenomena such as broken bright spots in the display area.

SUMMARY

In view of problems that occur in IPS or FFS mode liquid crystal display elements, such as residual image caused by weak anchoring ability of liquid crystal molecules and accumulation of DC charges, and a phenomenon of broken bright spots in the display caused by insufficient removal of photo-decomposition products, an object of the present disclosure is to provide a liquid crystal alignment agent, a liquid crystal alignment film and a liquid crystal display element with excellent residual image characteristics, good alignment effect and excellent removal of photo-decomposition products.

The technical solution to overcome the technical problems in the present disclosure is as follows:

The inventors found through a series of experiments that the above object of the present disclosure can be achieved by selecting at least one of a polyamic acid solution containing a specific structure and a polyimide solution maded by above plyamic acid.

Provided is a liquid crystal alignment agent, comprising a polymer and a solvent. The polymer comprises at least one of polyamic acid and polyimide. The polyamic acid is obtained by polymerization of diamine compound component A and dianhydride compound component B, and the polyimide is obtained by dehydration imidization of the polyamic acid. The diamine compound component A includes at least one of the diamine compounds represented by the following "Formula 1";

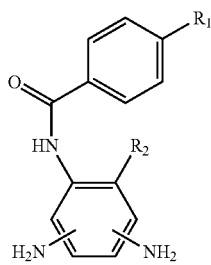

Formula 1 wherein R1 is selected from one of —F or —CF3; R2 is selected from one of —OH and —SH; remaining hydrogen atoms on both benzene rings can be substituted.

Further, the remaining hydrogen atoms on the two benzene rings in the diamine compound represented by "Formula 1" may be substituted by methyl groups. Further, the diamine compound represented by "Formula 1" has structural formulas shown in 1-1 to 1-5:

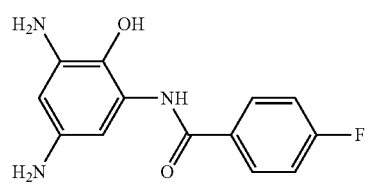

Formula 1-1

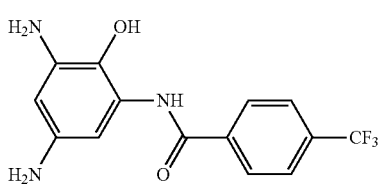

Formula 1-2

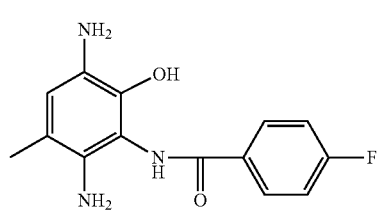

Formula 1-3

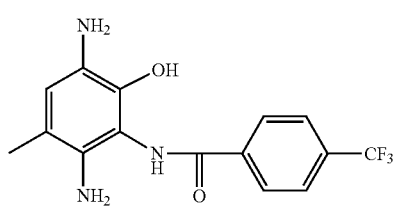

Formula 1-4

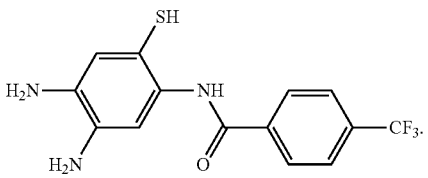

Formula 1-5

Further, the dianhydride compound component B includes at least one of 1,2,3,4-cyclobutanetetracarboxylic dianhydride and 1,3-dimethyl-1,2,3,4-cyclobutane tetracarboxylic dianhydride.

Further, the diamine compound component A in the above 1 further includes other diamine compounds other than the "formula 1" diamine compound. The other diamine compounds are one selected from 1,2-bis(4-aminophenoxy)ethane, N-methyl-4-aminophenylethylamine, p-phenylenediamine, m-phenylenediamine, 4,4'-diaminodiphenylmethane, 2,4-diaminododecyloxybenzene, 3,5-diaminobenzoic acid, 4,4'-diaminodiphenyl ether, 1,3-bis(4-aminophenyl)urea, 1,5-diaminonaphthalene, 1,8-diaminonaphthalene, 4-aminophenylethylamine, 4,4'-diaminodiphenylethane, 4,4'-diaminobenzophenone, 1,3-bis(4-aminophenoxy)propane, N,N'-bis(4-aminophenyl)piperazine, 2,2-bis[4-(4-aminophenoxy)phenyl]propane, 2,4-diaminooctadecyloxybenzene, 4,4'-diaminobenzamide, 2,2-bis[4-(4-aminophenoxy)phenyl]hexafluoropropane, 2,2-bis(4-aminophenyl)hexafluoropropane, 2,2'-dimethyl-4,4'-diaminobiphenyl and 4,4'-diaminodiphenylamine, or a mixture thereof.

Further, in the above diamine compound component A, a molar percentage of the diamine compound represented by Formula 1 is 5 to 80%, more preferably 10 to 50%.

Further, the dianhydride compound component B includes at least one of 1,2,3,4-cyclobutanetetracarboxylic dianhydride and 1,3-dimethyl-1,2,3,4-cyclobutanetetracarboxylic dianhydride.

Further, the above dianhydride compound component B may further include other dianhydride compounds other than 1,2,3,4-cyclobutanetetracarboxylic dianhydride and 1,3-dimethyl-1,2,3,4-cyclobutanetetracarboxylic dianhydride, for example, one selected from 1,2,3,4-cyclopentane tetracarboxylic dianhydride, 2,3,5-tricarboxyl cyclopentyl acetic acid dianhydride, Pyromellitic dianhydride, 1,2,4,5-cyclohexane tetracarboxylic acid dianhydride, 3,3',4,4'-biphenyl tetracarboxylic dianhydride, 3,3',4,4'-biphenylsulfone tetracarboxylic dianhydride, and 4-(2,5-dioxotetrahydrofuran-3-yl)-1,2,3,4-tetrahydronaphthalene-1,2-dicaroxylic anhydrides, or a mixture thereof.

Further, a molar ratio of the diamine compound component A to the dianhydride compound component B is 100:80 to 120, more preferably 100:90 to 100.

Further, the solvent is one selected from N-methyl-2-pyrrolidone γ-butyrolactone, N,N-dimethylacetamide, N,N-dimethylformamide, ethylene glycol monomethyl ether, ethylene glycol monoethyl ether, ethylene glycol monobuthyl ether, ethylene glycol dimethyl ether and diethylene glycol methyl ether acetate, or a mixture thereof.

A liquid crystal alignment film is made of the above liquid crystal alignment agent.

Provided is a liquid crystal display element, comprising the above liquid crystal alignment agent.

The present disclosure has the following advantageous effects:

1) The liquid crystal alignment film of the present disclosure can improve its anchoring ability to the liquid crystal and suppress residual image caused by small anisotropy after a long-term AC driving. The mechanism by which the liquid crystal alignment film of the present disclosure can improve the anchoring ability of the liquid crystal is still unclear. On the other hand, according to the following "an illustration of the beneficial effect", when the polyamic acid containing diamine with the specific structure of "Formula 1" of the present disclosure is cured at a high temperature, the diamine of the specific structure of "Formula 1" can be dehydrated intermolecularly with the dianhydride or intramolecularly. In addition, the resulting two products are relatively stable in property, cannot be easily hydrolyzed or degraded, and carboxyl residues on the surface of the PI film, can increase the force between the PI film and the liquid crystal molecules, thereby improving the anchoring ability of the liquid crystal. In order to explain the above reaction types more effectively, the following formula example is given, but is not to limit the present disclosure:

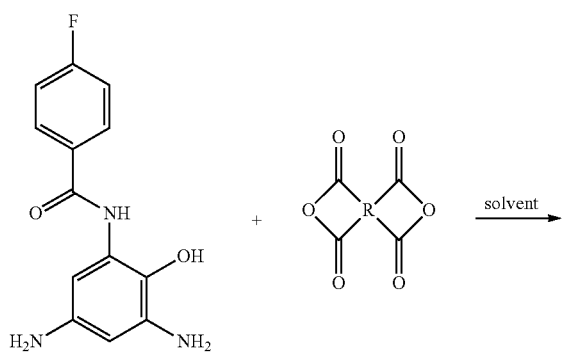

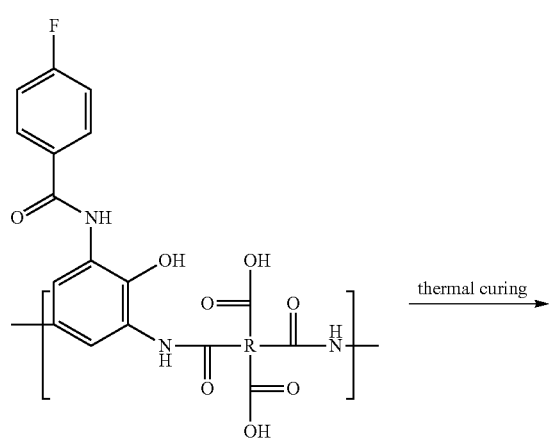

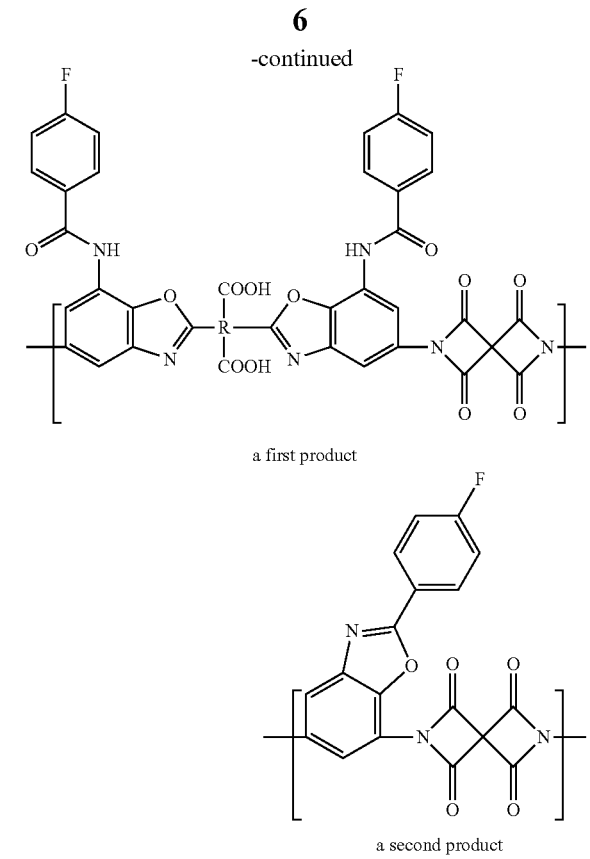

a first product a second product

An Illustration of the Beneficial Effect

It can be seen from the above formula that two products are generated in thermal curing, where the first product contains a large number of carboxyl groups, which can increase the force between the first product and the polar molecules of the liquid crystal.

2) The liquid crystal alignment agent and the liquid crystal alignment film of the present disclosure can quickly dissipate the accumulated DC charges, thereby suppressing the problem of residual image caused by the accumulation of the DC charges in the liquid crystal display element. The mechanism of rapid dissipation of DC charges can be considered as the reaction type in the above beneficial effect 1. The generated 1 and 2 products contain large conjugated groups, which can effectively accelerate the charge transfer.

3) After the photodecomposition alignment treatment, the liquid crystal alignment film of the present disclosure is excellent in the removal property of photo-decomposition products, and can suppress the phenomenon of poor alignment such as broken bright spots in the liquid crystal display element. According to the "benefit effect 1", the molecules of the liquid crystal aligning film of the present disclosure contain more carboxyl solubilizing groups. After the liquid crystal alignment film is subjected to the photodecomposition alignment treatment, the resulting photo-decomposition products can be more easily removed when contacted with water or an organic solvent.

4) The method of the present disclosure is simple and has wide market prospect, and is suitable for mass production.

DETAILED DESCRIPTION OF THE EMBODIMENTS

The principles and features of the present disclosure are described in combination with the examples as follows. The examples are given only for illustrating the present disclosure and are not intended to limit the present disclosure.

<Liquid Crystal Alignment Agent>

The liquid crystal alignment agent of the present disclosure comprises at least one of a polyamic acid solution or a polyimide solution.

1) Synthesis of Polyamic Acid

More specifically, the polyamic acid solution is a solution of a polymer obtained by polymerization of a diamine compound component A and a dianhydride compound component B in a reaction solvent, and then the polymer solution is added to a solvent for dilution to prepare a liquid crystal alignment agent, or the polymer solution is added to a poor solvent to obtain a polymer solid through precipitation, filtration and drying. Then, the polymer solid is added to a solvent for dilution to prepare the liquid crystal alignment agent of the present disclosure. The above diamine compound component A includes at least one of the compounds represented by the following Formula 1:

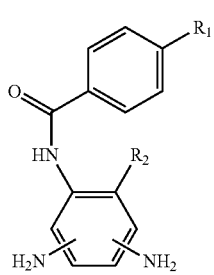

Formula 1 wherein R1 is selected from one of —F or —CF3; R2 is selected from one of —OH and —SH; and the remaining hydrogen atoms on both benzene rings may be substituted. The dianhydride compound component B includes at least one of 1,2,3,4-cyclobutanetetracarboxylic dianhydride and 1,3-dimethyl-1,2,3,4-cyclobutanetetracarboxylic dianhydride.

The present disclosure is not particularly limited to the solvent used in the polymerization reaction, as long as the solvent used can dissolve the diamine component A and the dianhydride component B of the present disclosure, for example, one solvent selected from N-methylpyrrolidone, N-ethylpyrrolidone, N,N-dimethylformamide, N,N-dimethylacetamide, dimethyl sulfoxide and 1,3-dimethylimidazolidinone, or a mixture thereof.

In addition, the polymerization reaction of the diamine compound component A and the dianhydride compound group B is carried out in the reaction solvent at a temperature of preferably 0 to 150° C., more preferably 20 to 80° C., for preferably 0.5 to 24 h, more preferably 2 to 6 h. In addition, the concentration of reaction is not particularly limited. If the reaction concentration is too low, it is difficult to obtain a high polymerization degree (a high molecular weight). If the reaction concentration is too high, the viscosity of the reaction solution is too large, which is not conducive to sufficient stirring. The reaction concentration is preferably 2 to 50% solids content (a ratio of the weight of the diamine compound component A and the dianhydride compound component B used in the reaction to the weight of the reaction solution), more preferably 5-30%.

The poor solvent used for precipitation of the polymer in the polyamic acid solution is not particularly limited as long as the polymer can be precipitated from the solvent, for example, water, methanol, ethanol, propanol, isopropanol, cyclohexane, n-hexane, butyl cellosolve, toluene, etc.

The solvent for the polymerization reaction or the polymer solid dilution is not particularly limited, as long as the polymer can be dissolved therein, and the prepared liquid crystal alignment agent has excellent coating performance on the substrate, for example, one solvent selected from N-methylpyrrolidone, N-ethylpyrrolidone, N,N-dimethylformamide, N,N-dimethylacetamide, dimethyl sulfoxide, 1,3-dimethylimidazolidone, ethylene glycol monobutyl ether, propylene glycol monobutyl ether, diethylene glycol dimethyl ether, diethylene glycol diethyl ether, diethylene glycol monomethyl ether and diethylene glycol monoethyl ether, and a mixture thereof, where the first six solvents have good solubility to the polymer, and the latter six solvents can improve the film performance and surface smoothness of the alignment film formed by the liquid crystal alignment agent.

2) Synthesis of Polyimide

The polyimide contained in the liquid crystal aligning agent of the present disclosure can be obtained by dehydration imidization of the synthesized polyamic acid. Polyimide may be a complete imidization product obtained by dehydrating and imidizing the entire polyamic acid as its precursor, or it may be a partial imidization product in which only a part of the polyamic acid is dehydrated and imidized to form the coexistence of polyimide and polyamic acid. An imidization rate of the polyimide is preferably 5 to 95%, more preferably 10 to 50%, and most preferably 10 to 30%. The imidization rate refers to the number of imide ring structures relative to the sum of the number of amide acid structures and imide ring structures. Here, a part of the imide ring may be an isoimide ring.

The above polyimide preparation method can adopt but is not limited to the following two imidization methods, which refer to thermal imidization method or chemical imidization method.

The thermal imidization method refers to directly heating and dehydrating the polyimide solid to form a ring at a temperature of preferably 150 to 300° C.

The chemical imidization method includes the following steps: polyamic acid is dehydrated and ring-closed in the presence of a dehydrating agent and a catalyst to prepare a polyimide at a relatively low temperature.

A solvent for the imidization reaction may be the same as the solvent for the polyamic acid reaction, so it will not be repeated.

A weight ratio of the polyamic acid to the imidization reaction solvent is 1:(2 to 50); the imidization reaction is carried out at a temperature of 0 to 100° C., more preferably 30 to 70° C., for 1 to 50 h, more preferably 2 to 15 h; the dehydrating agent may be selected from carboxylic acid anhydride compounds such as acetic anhydride, propionic anhydride or trifluoroacetic anhydride; a molar ratio of the raw material dianhydride for the polyamic acid to the dehydrating agent is preferably 1:(0.1 to 10), more preferably 1:(0.4 to 5); the catalyst may be selected from one or a mixture of pyridine, 4-methylpyridine, trimethylamine or triethylamine; and a molar ratio of the dehydrating agent to the catalyst is 1:(0.1 to 10), more preferably 1:(0.5 to 3).

After polyimide formation, the catalyst and dehydrating agent will remain in the solution. Therefore, it is preferable to recover the solid in the polyimide solution by the following means. Then, the recovered solid polymer is dissolved with an organic solvent again, and mechanical impurities are removed through filtration to obtain the liquid crystal alignment agent of the present disclosure.

The polyimide solution synthesized as described above may be poured into a poor solvent while stirring, or a poor solvent may be poured into the polyimide solution to precipitate a polymer. Multiple precipitations may be performed, and the precipitate is washed with a poor solvent to remove small molecular compounds, catalysts and dehydrating agents in the polyimide. Then, drying is performed at a normal temperature or a high temperature to obtain the polyimide solid powder of the present disclosure. The poor solvent for the precipitation of the polyimide solid and the solvent for re-dissolution of the polyimide solid of the present disclosure may be the same as the solvent for the precipitation and re-dissolution of the polyamic acid solid, so they will not be repeated here.

Further, the alignment agent further includes a molecular weight regulator, and the molecular weight regulator refers to monoacid anhydride compounds, monoamine compounds or monoisocyanate compounds. Specifically, the monoanhydride compounds refer to maleic anhydride, phthalic anhydride, itaconic anhydride, n-decyl succinic anhydride, n-dodecyl succinic anhydride, etc.; the monoamine compounds refer to aniline, n-butylamine, n-pentamine, n-hexamine, n-heptanamine or n-octylamine; and the monoisocyanate compounds refer to phenyl isocyanate, naphthalene isocyanate, etc. A molar ratio of the molecular weight regulator to the dianhydride compound component B is (0.01 to 20):100, preferably (0.5 to 5):100.

The beneficial effect of employing the further technical solution mentioned above is that, a polymer with a modified group at the end is synthesized by using a molecular weight regulator together with the diamine compound component A and the dianhydride compound component B, and the molecular weight of the polymer may be adjusted without affecting the technical effect of the alignment agent and the alignment film, so as to ensure the feasibility of the liquid crystal aligning agent for coating on a panel.

Further, the liquid crystal alignment agent may further include an additive, and the additive is one of epoxy compounds and silane compounds, or a mixture thereof. The epoxy compounds include but are not limited to ethylene glycol diglycidyl ether, polyethylene glycol diglycidyl ether, propylene glycol diglycidyl ether, polypropylene glycol diglycidyl ether, 1,6-Hexanediol diglycidyl ether, N,N,N', N'-tetraglycidyl-m-xylenediamine, N,N,N',N'-tetraglycidyl-4,4'-diaminodiphenylmethane or 3-(N,N-diglycidyl)aminopropyltrimethoxysilane. An addition amount of the epoxy compound additive is 0.1 to 20% of a total weight of the polymer, more preferably 3 to 10%. The silane compounds include but are not limited to 3-aminopropyltrimethoxysilane, 3-aminopropyltriethoxysilane, diethoxy(3-glycidyloxypropyl)methylsilane, 2-aminopropyltrimethoxysilane, 3-aminopropyltriethoxysilane, N-(2-aminoethyl)-3-aminopropyltrimethoxysilane, N-(2-aminoethyl)-3-aminopropylmethyldimethoxysilane, N-phenyl-3-aminopropyltrimethoxysilane, N-bis(ethylene oxide)-3-aminopropyltriethoxysilane. An addition amount of the silane compound additive is 0.1 to 10% of the total weight of the polymer, more preferably 0.5 to 3%.

The beneficial effect of employing the further technical solution mentioned above is that, the presence of the additive can improve the stability of the liquid crystal alignment film or improve the adhesion between the liquid crystal alignment film and the substrate.

Without affecting the efficacy of the present disclosure, the liquid crystal alignment agent of the present disclosure may further include other polymers, for example, polyamic acid obtained by polymerization of a diamine compound not represented by Formula 1 of the present disclosure with tetracarboxylic anhydride and polyimide generated by dehydration imidization of the polyamic acid, polyester, polyamide, cellulose derivative, polyacetal, polystyrene derivative, etc. The effect of adding other polymers is to improve solution characteristics or electrical characteristics. An addition amount of other polymers is 50% or less, more preferably 0.1 to 40% of a total amount of the polymer in the liquid crystal alignment agent.

The liquid crystal alignment agent may be prepared by mixing a polymer and an additive in a solvent at 10 to 100° C. with stirring, more preferably at 25 to 60° C.

<Liquid Crystal Alignment Film>

The liquid crystal alignment film of the present disclosure is preferably produced by the following steps: applying the liquid crystal alignment agent of the present disclosure onto a substrate, then curing the applied substrate by baking, subjecting the cured film to an alignment treatment of irradiation with polarized UV-light, and then treating the film by contact with water or an organic solvent then baking, thereby obtaining the liquid crystal alignment film of the present disclosure.

The substrate on which the liquid crystal alignment agent of the present disclosure is applied is not particularly limited in the present disclosure, and glass substrates, silicon nitride substrates, transparent polyimide substrates and polyester substrates may be used. It is preferable to apply onto a glass substrate with ITO electrodes, and the ITO is indium tin oxide, which provides an electric field to control the motion deflection of the liquid crystal, and then is combined with a polarizer to achieve the purpose of display.

The method for applying the liquid crystal alignment agent of the present disclosure is not particularly limited as long as the liquid crystal alignment agent of the present disclosure may be applied onto a substrate, where the method includes surface printing, spin coating and ink jetting.

The substrate on which the liquid crystal alignment agent of the present disclosure is applied is usually baked at 60 to 130° C. for 1 to 5 min to remove the solvent from the liquid crystal alignment agent, and then baked at 150 to 260° C. for 10 to 120 min, to dehydrate and cyclize the polyamic acid in the liquid crystal alignment agent into polyimide, so that the prepared film is more stable and is not easily decomposed due to long-term use. In the present disclosure, a thickness of the baked film is preferably 10 to 200 nm, and more preferably 30 to 80 nm.

The alignment treatment of the above film includes a rubbing alignment treatment method and a photoalignment treatment method. For the beneficial effect of the liquid crystal alignment agent of the present disclosure, it is more preferable to use the photoalignment treatment method, that is, the above film is irradiated with polarized UV-light in a certain direction. During the above photoalignment treatment, a wavelength of the polarized light is 100 to 400 nm, more preferably 200 to 300 nm, and a UV dosage required for the film photoalignment treatment is preferably 10 to 3000 mj/cm$^2$, more preferably 100 to 1000 mj/cm$^2$.

The above film irradiated with polarized UV-light is subjected to a contact treatment with water or an organic solvent, which aims to remove the decomposition products formed by photoalignment. The liquid crystal alignment film of the present disclosure has excellent removal effect of decomposition products after photoalignment treatment, and the prepared liquid crystal display element has better display effect without abnormal phenomenons such as broken bright spots.

The organic solvent for the above contact treatment includes isopropanol, methanol, ethanol, ethyl lactate, isohexanediol, diacetone alcohol, etc. Among them, methanol, ethanol, and isopropanol are more preferable, and isopropanol is more preferable. A mixture of water and an organic solvent may also be used in the contact treatment.

The above film after contact treatment with water and an organic solvent needs to be re-baked, which aims to remove the contact treated water or organic solvent and promote the realignment of molecular chains on the surface of the film. The temperature for re-baking is preferably 170 to 280° C., more preferably 180 to 250° C., and the time for curing through baking is preferably 5 to 120 min, more preferably 10 to 60 min.

<Liquid Crystal Display Element>

IPS (in-plane switching) and FFS (fringe field switching) liquid crystal display elements are fabricated by the following methods. In view of the beneficial effects of the present disclosure, the present disclosure is more suitable for the manufacture of IPS and FFS photo-alignment liquid crystal display elements, but the present disclosure is not limited thereto, and all within the scope of the spirit of the present disclosure is protected by the present disclosure.

A method for fabricating the liquid crystal display element comprises the following steps: preparing two substrates, one with IPS or FFS type ITO electrodes, and the other without ITO electrodes, applying each substrate with a layer of the liquid crystal alignment agent of the present disclosure, and then baking the liquid crystal alignment agent on a hot plate at 100° C. for 2 min, and in an oven at 220° C. for 30 min, and then the two substrates were be irradiated in a certain direction with polarized UV-light with a wavelength of 254 nm.

The above two substrates after photo-alignment treatment are soaked in an isopropyl alcohol solvent for 3 min, and then the two substrates are placed in an oven for heat-baking treatment again at a temperature of 220° C. for 30 min.

For the two substrates baked again as above, one substrate is dispersed with spacer particles with a diameter of 4 μm, and another substrate is coated with a sealant; moreover, the alignment films are faced to each other to attach a cell in a liquid crystal alignment direction of 180°, then, the sealant is cured to prepare a liquid crystal hollow cell. Liquid crystal is injected into the liquid crystal hollow cell by vacuum filling, the liquid crystal liquid inlet is sealed, and then the liquid crystal display element is heat-treated at 85° C. for 30 min to obtain an IPS or FFS liquid crystal display element.

<Synthesis Example of Diamine Compounds>

Synthesis Example 1

The preparation of diamine compounds represented by structural formula 1-1 is shown in synthetic route 1:

synthetic route 1

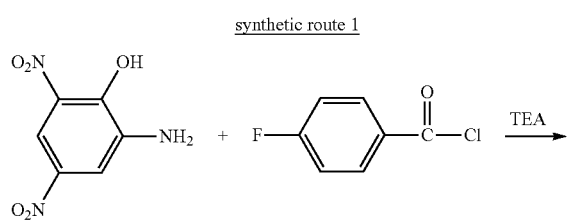

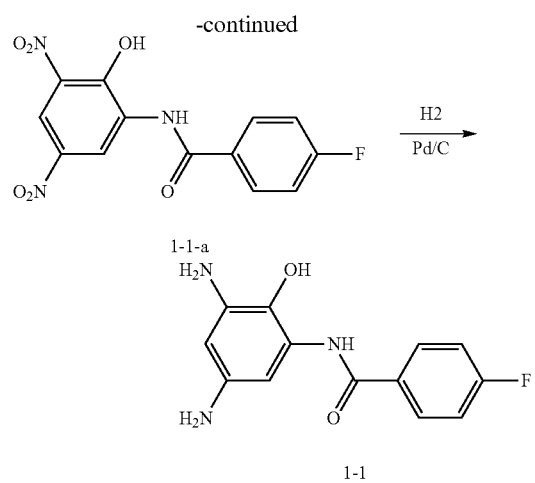

The specific synthesis process is as follows:

(1) Synthesis of Compound 1-1-a 2-hydroxy-3-amino-1,5-dinitrobenzene (19.91 g, 100 mmol), triethylamine (11.13 g, 110 mmol) and 200 mL of DMAC solvent are put into a 500 mL three-necked round bottomed flask and cooled to 0 to 10° C.; then, a mixture of p-fluorobenzoyl chloride (17.44 g, 110 mmol) and 100 ml of solvent DMAC is added dropwise to the system within 2 h, and heated to 30° C. for 5 h. Next, the reaction solution is poured into ice water, and the precipitate is filtered and washed with water; the filter cake is crystallized from a mixture of tetrahydrofuran/methanol (2:3) to obtain 26 g of a pale yellow solid with a product yield of 81%. The product is tested by high-resolution mass spectrometry, M/Z= 321.0355, which is confirmed to be the target product 1-1-a.

(2) Synthesis of Compound 1-1

The obtained compound 1-1-a (16.06 g, 50 mmol), 10% palladium carbon (1.6 g, solid content of 30%) and 400 g tetrahydrofuran are put into a 1 L autoclave, the autoclave is sealed and replaced with hydrogen for 3-5 times, where the hydrogen is pressurized to 1.0 to 1.5 MPa for reaction at 50 to 60° C. under stirring. After the reaction, the catalyst is removed by filtration and the filtrate is desolvated. 40 g of ethanol and 40 g of ethyl acetate are added to the obtained solid and stirred for 30 min. After filtration and drying, 12 g of white solid is obtained, with a yield of 92% and a two-step total yield of 74.5%.

The compound has a high resolution mass spectrometry under ESI source, with a positive ion mode, a theoretical value of 261.0914 and a test value of 261.0886. Elemental analysis ($C_{13}H_{12}N_3O_2F$), theoretical value C: 59.77, H: 4.63, N: 16.08, O: 12.25, F: 7.27, the measured values C: 59.77, H: 4.62, N: 16.07, O: 12.26, F: 7.28, so the compound are determined to be the target compound 1-1.

Synthesis Examples 2-5

The compounds represented by structural formulas (1-2)-(1-5) may be synthesized according to synthesis route 1 with dinitro compounds, p-fluorobenzoyl chloride or p-trifluoromethylbenzoyl chloride corresponding to their parent compounds respectively. The amide is synthesized first, and then hydrogenated and reduced to the target product. The high-resolution mass spectrometry results, elemental analysis results, synthesis yields, and structural formulas of the dinitro compounds used in the synthesis of the corresponding target compounds are shown in Table 1 below.

TABLE 1

Mass spectrometry, elemental analysis, yield and raw material structure data of each compound in Synthesis Examples 2-5

| Synthesis Example | Corresponding target compound | High-resolution mass spectrometry data | Elemental analysis data/% | Yield/% | The structural formula of the corresponding raw material of the original dinitro compound |
|---|---|---|---|---|---|
| 2 | 1-2 | $C_{14}H_{12}F_3N_3O_2$ M/Z = 311.0895 | C: 54.02, H: 3.88, F: 18.32, N: 13.50, O: 10.28 | 65.6 | |
| 3 | 1-3 | $C_{14}H_{14}FN_3O_2$ M/Z = 275.1056 | C: 61.08, H: 5.13, F: 6.90, N: 15.25, O: 11.63 | 73.5 | |
| 4 | 1-4 | $C_{15}H_{14}F_3N_3O_2$ M/Z = 325.1022 | C: 55.38, H: 4.35, F: 17.51, N: 12.93, O: 9.84 | 80.6 | |
| 5 | 1-5 | $C_{14}H_{12}F_3N_3OS$ M/Z = 327.0655 | C: 51.38, H: 3.71, F: 17.40, N: 12.83, O: 4.89, S: 9.79 | 68.3 | |

EXAMPLES

Hereinbelow, the present disclosure will be described in more detail in reference to Examples; however, the present disclosure is not limited to such examples. The abbreviations of compounds used in this example and the comparative example and measurement methods of their characteristics are as follows:

NMP: N-methyl-2-pyrrolidone; BC: ethylene glycol monobutyl ether

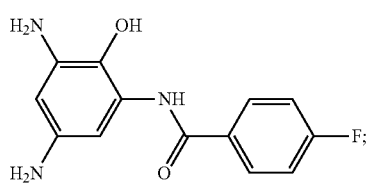

(1-1)

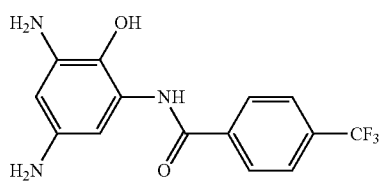

(1-2)

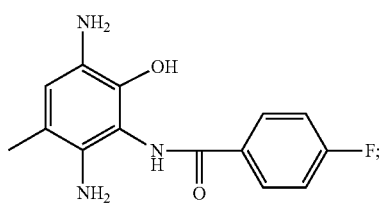

(1-3)

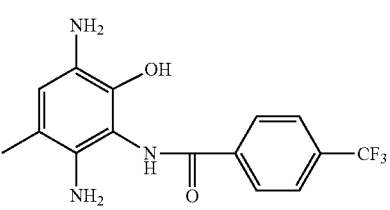

(1-4)

-continued

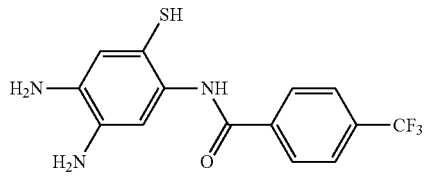
(1-5)

a-1: p-phenylenediamine; a-2: 4,4'-diaminodiphenyl ether;
a-3: 4,4'-diaminodiphenylamine; a-4: 4,4'-diaminobenzamide;
a-5: 1,2-bis(4-aminophenoxy)ethane
b-1: 1,2,3,4-cyclobutanetetracarboxylic dianhydride;
b-2: 1,3-dimethyl-1,2,3,4-cyclobutanetetracarboxylic dianhydride
b-3: 3,3',4,4'-biphenyltetracarboxylic dianhydride <Measurement of Imidization Rate>

The imidized solid powder was added with deuterated dimethyl sulfoxide solvent to make a 5% solution, which was completely dissolved by ultrasonic, and the solution was added to an NMR sample tube, and an NMR hydrogen spectrum was measured using a NMR analyzer (JNM-ECZ400, manufactured by JEOL DATUM). The proton of the structure which did not change before and after imidization was set as a reference proton, and the imidization rate was calculated according to the following formula using the product of the proton and the carboxylic acid proton in the vicinity of 11-14 ppm.

Imidization rate=$(1-a/b)100\%$

The above formula a was a ratio of the product of carboxylic acid protons in the tested $H^1$-NMR to the reference protons, and b was a ratio of the number of carboxyl protons to the number of reference protons when imidization has not occurred.

Example 1

Synthesis of polyamic acid solution: under nitrogen atmosphere, diamine compounds (7.837 g, 30 mmol) represented by structural formula (1-1), a-1 (2.163 g, 20 mmol), a-2 (6.007 g, 30 mmol), a-5 (4.886 g, 20 mol) and 148.474 g of NMP were put into a 500 ml three-necked round-bottomed flask), and stirred while delivering nitrogen for complete dissolution, then 19.6 g (100 mmol) of b-1 and 148.474 g of NMP were added into the system with an exothermic reaction, and stirred at room temperature for 10 h to obtain polyamic acid polymer PA-1 with a solids content of 12%.

Dilution: 100 g of PA-1 polyamic acid solution were taken, into which 71.6 g of NMP and 68.4 g of BC were added, and stirred at room temperature for 2 h, and then filtered through a 0.2 m filter to obtain the liquid crystal alignment agent of Example 1. The concentration of the polymer in the liquid crystal alignment agent was 5%, and a solvent ratio was NMP:BC=70:30

Examples 2-25

Examples 2 to 25 were prepared by the same method as Example 1, where the concentration of the polymer in the obtained liquid crystal alignment agent was 5%, and a solvent ratio was NMP:BC=70:30 except that types and amount ratios of the used monomers were changed, and the specific results were shown in Table 2 below.

TABLE 2

The type and amount of monomers used in the liquid crystal alignment agent of Examples

| Serial Number | Diamine (mol %) | Dianhydride (mol %) |
| --- | --- | --- |
| Example 1 | 1-1(30), a-1(20), a-2(30), a-5(20) | B-1 (100) |
| Example 2 | 1-2(30), a-1(20), a-2(30), a-5(20) | B-1 (100) |
| Example 3 | 1-3(30), a-1(20), a-2(30), a-5(20) | B-1 (100) |
| Example 4 | 1-4(30), a-1(20), a-2(30), a-5(20) | B-1 (100) |
| Example 5 | 1-5(30), a-1(20), a-2(30), a-5(20) | B-1 (100) |
| Example 6 | 1-1(30), a-1(20), a-2(30), a-5(20) | b-1 (60), b-2 (40) |
| Example 7 | 1-2(40), a-1(10), a-2(30), a-5(20) | B-1 (100) |
| Example 8 | 1-3(50), a-1(20), a-2(10), a-5(20) | B-1 (100) |
| Example 9 | 1-4(20), a-1(30), a-2(30), a-5(20) | B-1 (100) |
| Example 10 | 1-5(10), a-1(40), a-2(30), a-5(20) | B-1 (100) |
| Example 11 | 1-1(20), 1-2(20), a-2(40), a-5(20) | B-1 (100) |
| Example 12 | 1-2(10), 1-3(20), a-1(30), a-2(30), a-5(10) | B-1 (100) |
| Example 13 | 1-3(30), 1-4(20), a-2(30), a-5(20) | B-1 (100) |
| Example 14 | 1-1(30), 1-5(20), a-2(30), a-5(20) | B-1 (100) |
| Example 15 | 1-2(30), 1-4(20), a-3(30), a-5(20) | B-1 (100) |
| Example 16 | 1-1(30), a-1(20), a-2(30), a-3(20) | b-1 (70), b-2 (30) |
| Example 17 | 1-2(30), a-1(20), a-2(30), a-3(20) | b-1 (30), b-3 (70) |
| Example 18 | 1-3(30), a-1(20), a-2(30), a-5(20) | b-2 (30), b-3 (70) |
| Example 19 | 1-4(30), a-1(20), a-2(30), a-5(20) | b-2 (40), b-3 (60) |
| Example 20 | 1-5(30), a-1(20), a-4(30), a-5(20) | b-1 (30), b-3 (70) |
| Example 21 | 1-1(30), a-1(20), a-4(30), a-5(20) | b-1 (70), b-2 (30) |
| Example 22 | 1-2(30), a-1(20), a-4(30), a-5(20) | b-1 (30), b-3 (70) |
| Example 23 | 1-3(30), a-1(20), a-4(30), a-5(20) | b-2 (30), b-3 (70) |
| Example 24 | 1-4(30), a-1(20), a-4(30), a-5(20) | b-2 (40), b-3 (60) |
| Example 25 | 1-5(30), a-1(20), a-4(30), a-5(20) | b-1 (30), b-3 (70) |

Example 26

The amide acid solution PA-1 (100 g) prepared in example 1 was taken, into which 140 g of NMP solvent, 2.34 g of pyridine and 9.07 g of acetic anhydride were added, and heated to 60° C. with stirring for 6 h to carry out chemical imidization. Then, the obtained reaction solution was dropped into 1000 ml of methanol while stirring, and a white precipitate was filtered out, then the filter cake was rinsed with methanol, and then dried to obtain a white solid powder with an imidization rate of 72%. 5 g of the obtained solid powder were added with 66.5 g of NMP and 28.5 g of BC, and stirred at room temperature for 5 h; the obtained polyimide solution was filtered through a filter membrane with a pore size of 0.2 μm to obtain the liquid crystal alignment agent PI-1 corresponding to Example 26.

Example 27

30 g of the liquid crystal alignment agent PI-1 prepared in Example 26 and 70 g of the liquid crystal alignment agent PA-2 prepared in Example 2 were put in a 250 mL three-necked bottle, and the system had no precipitation or turbidity, and stirred for 5 h at room temperature and filtered with a 0.2 μm filter membrane to obtain the liquid crystal alignment agent corresponding to Example 27.

Comparative Example 1

Synthesis of polyamic acid solution: under nitrogen atmosphere, a-1 (2.163 g, 20 mmol), a-2 (6.007, 30 mmol), a-4

(6.818, 30 mmol), a-5 (4.886 g, 20 mol) and 144.7 g of NMP were put into a 500 ml three-necked round-bottomed flask), and stirred while delivering nitrogen for complete dissolution, then 19.6 g (100 mmol) of b-1 and 144.7 g of NMP were added into the system with an exothermic reaction, and stirred at room temperature for 10 h to obtain polyamic acid polymer PA-1 with a solids content of 12%.

Dilution: 100 g of PA-1 polyamic acid solution were taken, into which 71.6 g of NMP and 68.4 g of BC were added, and stirred at room temperature for 2 h, and then filtered through a 0.2 μm filter to obtain the liquid crystal alignment agent of Comparative Example 1

The concentration of the polymer in the liquid crystal alignment agent was 5%, and a solvent ratio was NMP:BC=70:30.

Comparative Examples 2 to 7 were prepared by the same method as Comparative Example 1, where the concentration of the polymer in the obtained liquid crystal alignment agent was 5%, and a solvent ratio was NMP:BC=70:30 except that types and amount ratios of the used monomers were changed, and the specific results were shown in Table 3 below.

TABLE 3

The type and amount of monomers used in the liquid crystal alignment agents of Comparative Examples

| Polymer | Diamine (mol %) | Dianhydride (mol %) |
| --- | --- | --- |
| Comparative Example 1 | a-1(20), a-2(30), a-4(30), a-5(20) | B-1 (100) |
| Comparative Example 2 | a-1(20), a-2(30), a-4(30), a-5(20) | b-1(70), b-2(30) |
| Comparative Example 3 | a-1(20), a-2(30), a-4(30), a-5(20) | b-1(30), b-3(70) |
| Comparative Example 4 | a-1(50), a-3(30), a-5(20) | B-1 (100) |
| Comparative Example 5 | a-1(30), a-4(30), a-5(40) | B-1 (100) |
| Comparative Example 6 | a-2(30), a-3(20), a-4(30), a-5(20) | B-1 (100) |
| Comparative Example 7 | a-1(30), a-2(30), a-3(20), a-4(20) | b-1(30), b-3(70) |

Evaluation Method:

The liquid crystal display cell was prepared according to the following method: two pieces of 3 cm×4 cm glass substrate with a thickness of 0.7 mm were prepared, in which a lower substrate was provided with a comb-shaped ITO electrode having a thickness of 50 nm, a spacing between adjacent comb-shaped electrodes was 3 μm, and pixel electrodes and common electrodes were crosswise arranged. The upper glass substrate was provided without electrodes. The liquid crystal alignment agent prepared in Example 1 was coated on the two substrates, and subjected to pre-curing in a hot plate at 85° C. for 3 min and main curing in a circulating oven at 240° C. for 60 min to obtain a polyimide coating with a film thickness of 80 nm. The upper and lower glass substrates with polyimide coating were irradiated with linearly polarized UV-light for photo-alignment treatment, where the irradiated polarized UV-light had a wavelength of 254 nm with a light dose of 500 mj/cm$^2$. Then, the upper and lower substrates were soaked in a 1:1 mixture of water and isopropanol for 2 min, and heated in a thermal cycle oven at 230° C. for 30 min. For the upper and lower glass substrates that have subjected to alignment treatment, one substrate was sprayed with spacer particles with a diameter of 4 μm, and another substrate was coated with a sealant at a position 5 mm away from a short side of the glass substrate, leaving a liquid crystal filling inlet with a diameter of 5 mm; next, the upper and lower substrates were bonded together in such a way that the alignment films were faced to each other, the polarization axes of the photoalignment treatment were parallel, and the overlapping width of the upper and lower substrates was 3 cm, and the bonded two substrates were fixed with a clamp, and cured at a temperature of 150° C. for 1 h, to prepare a liquid crystal hollow cell. The liquid crystal display element corresponding to Example 1 was prepared.

The liquid crystal display elements corresponding to Examples 2 to 27 and Comparative Examples 1 to 7 were prepared according to the same method as above, except that the coated liquid crystal alignment agents needed to be changed to those corresponding to Examples 2 to 27 and Comparative Examples 1 to 7.

(1) Characterization of the Alignment Agent's Ability to Align Liquid Crystals

In IPS liquid crystal devices, the alignment ability of the alignment agent to the liquid crystal can be characterized by the change of the alignment state of the liquid crystal before and after long-term AC driving, that is, a smaller change in the arrangement state of the liquid crystal before and after long-time driving indicated that the anchoring ability of the alignment agent to the liquid crystal was stronger; otherwise, it was indicated that the anchoring force of the alignment agent was weak. The specific embodiments were provided as follows:

The test value of the initial azimuthal angle of the liquid crystal display elements prepared in the examples and comparative examples was set to be X, and then the liquid crystal display elements prepared in the examples and comparative examples were driven for 2 h with a square wave AC voltage of 6V and 60 HZ, the pixel electrode and the common electrode were short-circuited for 5 min, and then the azimuthal angle was tested again at the same point. At this time, the test value was set to be Y, and the absolute value of the difference between the alignment angles of the two tests was set as α=|X−Y|. (Equipment: RETS-100, Otsuka Electronic Equipment Co., Ltd.)

The evaluation results of the anchoring force of the alignment agents were provided as follows:

√: ≤0.5°, the anchoring performance of the alignment agent is good.

√: ≤1°, the anchoring performance of the alignment agent is general.

x: >1°, the anchoring performance of the alignment agent is bad.

(2) Characterization of Residual Image Disappearance Rate Due to the DC Accumulation of the Liquid Crystal Display Element The prepared liquid crystal cell was arranged between two orthogonal polarizers, the backlight was turned on without voltage application, and the direction of the liquid crystal cell was adjusted in such a way that the brightness of the transmitted light was minimized. Then, the V-T curve of the liquid crystal cell was measured while applying an AC voltage with a frequency of 60 Hz to the liquid crystal cell to drive the liquid crystal cell (Equipment: PWW-VT type VT test system, manufactured by Dongxu Electric Technology Co., Ltd.), and the AC driving voltage with a relative transmittance of 23% was calculated. Next, an AC voltage with a relative transmittance of 23% was applied to the liquid crystal cell, while a DC voltage of 2V was applied.

After driving for 60 min, the DC voltage was removed, and the liquid crystal cell was driven only by the original AC voltage. A time Ts required for the liquid crystal cell from removing the DC voltage to reducing the relative transmittance below 30%. was calculated.

The evaluation results of the residual image disappearance rate were as follows:

√: Ts≤3s, the residual image disappeared quickly, indicating that the liquid crystal display element had excellent anti-residual image performance.

Δ: 30s≥TS≥3S, the residual image disappearance rate was general, indicating that the liquid crystal display element had general anti-residual image performance.

x: Ts≤30s, the residual image disappeared slowly, indicating that the liquid crystal display element had bad anti-residual image performance.

(3) Characterization of Removal of Photo-Decomposition Products

If the removal of the photo-decomposition products was not sufficient, and the remaining part would inevitably affect the liquid crystal alignment of the surrounding area, with a macro performance that the prepared liquid crystal display element had the phenomenon of poor display of broken bright spots. The implementation method was as follows:

The prepared liquid crystal display element was placed on the LED backlight, and then the liquid crystal display element was placed between two polarizers with orthogonal polarization axes, and the liquid crystal display element was rotated to achieve the lowest brightness. Then, without driving the liquid crystal cell, whether broken bright spots occurred on the liquid crystal display element or not was observed with a 10× magnifying mirror (Equipment: PEAK, 1983-10×). The removal of photo-decomposition products was regarded as "good" if no broken bright spots were observed, and the liquid crystal display element with broken bright spots was regarded as "poor" for the removal of photo-decomposition products.

Evaluation Results:

For the liquid crystal display elements corresponding to the liquid crystal aligning agents prepared in Examples 1 to 27 and Comparative Examples 1 to 7, the corresponding evaluation results were shown in Table 4 below.

TABLE 4

Evaluation results of liquid crystal display elements in Examples and Comparative Examples

| Ser. No. | Corresponding Examples | Evaluation of Anchoring Performance of the Alignment Agent | Evaluation of residual image disappearance rate due to DC charge accumulation | Evaluation of removal performance of photodegradation products |
|---|---|---|---|---|
| 1 | Example 1 | √ | √ | good |
| 2 | Example 2 | √ | √ | good |
| 3 | Example 3 | √ | √ | good |
| 4 | Example 4 | √ | √ | good |
| 5 | Example 5 | √ | √ | good |
| 6 | Example 6 | √ | √ | good |
| 7 | Example 7 | √ | √ | good |
| 8 | Example 8 | √ | √ | good |
| 9 | Example 9 | √ | √ | good |
| 10 | Example 10 | √ | √ | good |
| 11 | Example 11 | √ | √ | good |
| 12 | Example 12 | √ | √ | good |
| 13 | Example 13 | √ | √ | good |
| 14 | Example 14 | √ | √ | good |
| 15 | Example 15 | √ | √ | good |
| 16 | Example 16 | √ | √ | good |
| 17 | Example 17 | √ | √ | good |
| 18 | Example 18 | √ | √ | good |
| 19 | Example 19 | √ | √ | good |
| 20 | Example 20 | √ | √ | good |
| 21 | Example 21 | √ | √ | good |
| 22 | Example 22 | √ | √ | good |
| 23 | Example 23 | √ | √ | good |
| 24 | Example 24 | √ | √ | good |
| 25 | Example 25 | √ | √ | good |
| 26 | Example 26 | √ | √ | good |
| 27 | Example 27 | √ | √ | good |
| 28 | Comparative Example 1 | x | x | bad |
| 29 | Comparative Example 2 | x | x | bad |
| 30 | Comparative Example 3 | x | Δ | bad |
| 31 | Comparative Example 4 | x | x | bad |
| 32 | Comparative Example 5 | x | x | bad |
| 33 | Comparative Example 6 | x | x | bad |
| 34 | Comparative Example 7 | x | Δ | bad |

It can be seen that, compared to the prior art, a diamine monomer containing a specific structure of "Formula 1" was introduced in the synthesis process of the liquid crystal alignment agent of the present disclosure. The prepared liquid crystal alignment agent has advantages of strong liquid crystal alignment ability, fast dissipation of DC bias accumulated charges, and easy removal of decomposition products after photoalignment, which can eliminate residual image caused by weak alignment ability of the alignment agent (i.e., small anisotropy), suppress residual image caused by slow dissipation of the DC bias charges, and suppress the defect of broken bright spots caused by insufficient removal of photodecomposition products, and IPS-type and FFS-type liquid crystal display elements with excellent residual image characteristics and excellent display effect can be obtained. The method of the present disclosure is simple and has wide market prospect, and is suitable for mass production.

What are described above are merely preferred examples of the present disclosure, and are not to limit the present disclosure, and any modification, equivalent and improvement within the spirit and principles of the present disclosure shall be covered in the protective scope of the present disclosure.

What is claimed is:

1. A liquid crystal alignment agent, comprising a polymer and a solvent, wherein the polymer comprises at least one of polyamic acid and polyimide, the polyamic acid is obtained by polymerization of diamine compound component A and dianhydride compound component B, and the polyimide is obtained by dehydration imidization of the polyamic acid; and wherein the diamine compound component A comprises at least one of the diamine compounds represented by the following "Formula 1";

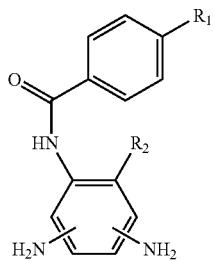

Formula 1 wherein $R_1$ is selected from one of —F or —CF3; R2 is selected from one of —OH and —SH; and remaining hydrogen atoms on two benzene rings are capable of being substituted.

2. The liquid crystal alignment agent according to claim 1, wherein the remaining hydrogen atoms on two benzene rings in the diamine compound represented by "Formula 1" are capable of being substituted by methyl groups.

3. The liquid crystal alignment agent according to claim 1, wherein the diamine compound represented by "Formula 1" has structural formulas shown in 1-1 to 1-5:

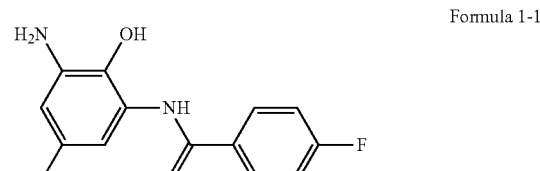

Formula 1-1

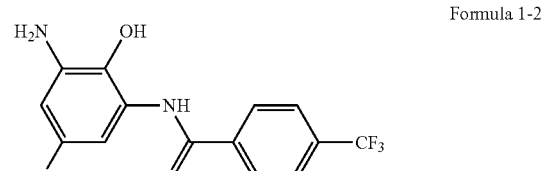

Formula 1-2

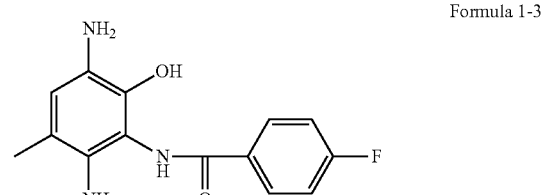

Formula 1-3

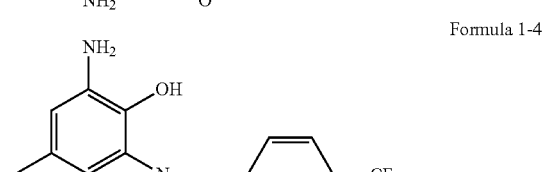

Formula 1-4

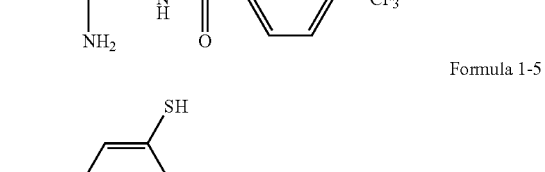

Formula 1-5

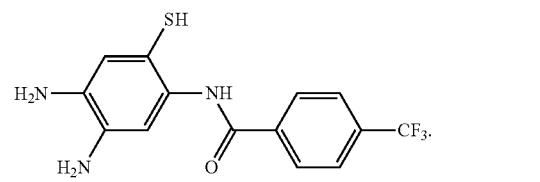

4. The liquid crystal alignment agent according to claim 1, wherein the dianhydride compound component B comprises at least one of 1,2,3,4-cyclobutanetetracarboxylic dianhydride and 1,3-dimethyl-1,2,3,4-cyclobutanetetracarboxylic dianhydride.

5. The liquid crystal alignment agent according to claim 1, wherein the diamine compound component A further comprises other diamine compounds other than the diamine compound represented by "Formula 1", and the other diamine compounds are one selected from 1,2-bis (4-aminophenoxy) ethane, N-methyl-4-aminophenylethylamine, p-phenylenediamine, m-phenylenediamine, 4,4'-diaminodiphenylmethane, 2,4-diamindododecanoxybenzene, 3,5-diaminobenzoic acid, 4,4'-diaminodiphenyl ether and 1,3-bis (4-aminophenyl) urea, or a mixture thereof.

6. The liquid crystal alignment agent according to claim 1, wherein the dianhydride compound component B further comprises other dianhydride compounds other than the dianhydride compound 1,2,3,4-cyclobutanetetracarboxylic dianhydride and 1,3-dimethyl-1,2,3,4-cyclobutanetetracarboxylic dianhydride, and the other diamine compounds are one selected from 1,2,3,4-cyclopentane tetracarboxylic dianhydride, 2,3,5-tricarboxyl cyclopentyl acetic acid dianhydride, Pyromellitic dianhydride, 1,2,4,5-cyclohexane tetracarboxylic acid dianhydride, 3,3', 4,4'-biphenyl tetracarboxylic acid dianhydride and 3,3', 4,4'-biphenylsulfone tetracarboxylic acid dianhydride, or a mixture thereof.

7. A liquid crystal alignment film, wherein the liquid alignment film is made of the liquid crystal alignment agent according to claim 1.

8. A liquid crystal display element, comprising the liquid crystal alignment film according to claim 7.

* * * * *